United States Patent
Hirata et al.

[11] Patent Number: 5,868,458
[45] Date of Patent: Feb. 9, 1999

[54] INTERIOR MATERIAL FOR AUTOMOTIVE VEHICLE

[75] Inventors: Tomio Hirata, Eaton, Ohio; Kazuo Matsuyama, Shizuoka, Japan; Kazuyuki Yamamoto, Shizuoka, Japan; Kazushige Ohnishi, Shizuoka, Japan; Motoru Komatsu, Kanagawa, Japan; Satoru Ichikawa, Kanagawa, Japan; Akira Kawai, Kanagawa, Japan; Satoru Yoshikawa, Kanagawa, Japan

[73] Assignees: Nissan Motor Co., Ltd., Yokohama; Nihon Plast Co., Ltd., Fuji, both of Japan

[21] Appl. No.: 840,656

[22] Filed: Apr. 25, 1997

[30] Foreign Application Priority Data

Apr. 26, 1996 [JP] Japan .................................. 8-107040
Apr. 26, 1996 [JP] Japan .................................. 8-107041

[51] Int. Cl.$^6$ .................................................. B60R 21/04
[52] U.S. Cl. ......................................... 296/189; 280/751
[58] Field of Search ................................. 296/189, 188, 296/210, 211, 39.1, 39.3; 280/751

[56] References Cited

U.S. PATENT DOCUMENTS 5,564,744 10/1996 Frost ..................................... 296/189 X
5,641,195 6/1997 Patel et al. ............................... 296/189
5,660,426 8/1997 Sugimori et al. ......................... 296/189
5,709,407 1/1998 Stephens et al. ..................... 296/189 X

FOREIGN PATENT DOCUMENTS 6-72153 3/1994 Japan .

*Primary Examiner*—Joseph D. Pape
*Attorney, Agent, or Firm*—Foley & Lardner

[57] ABSTRACT

A pillar garnish for a front pillar disposed between a front windshield glass and a side window glass of an automotive vehicle. The pillar garnish comprises a main body section formed of plastic and secured to a vehicle body. The main body section is generally channel-shaped to cover the front pillar forming part of the vehicle body. The main body section has an inner surface facing the front pillar, and an outer surface facing a vehicle passenger inside a passenger compartment. A plurality of reinforcement ribs are formed at the inner surface of the main body section and integral with the main body section. Each reinforcement rib extends perpendicular to the inner surface. Additionally, a plurality of auxiliary ribs are formed at the inner surface of the main body section and integral with the main body section. Each auxiliary rib extends parallel with each reinforcement rib. Each rib is located between the reinforcement ribs which are located adjacent each other. Each rib extends to occupy at least a part of a region surrounded by the inner surface of the main body section and first and second imaginary straight lines in a transverse plane perpendicular to a longitudinal axis of the main body section.

9 Claims, 7 Drawing Sheets

INTERIOR MATERIAL FOR AUTOMOTIVE VEHICLE

BACKGROUND OF THE INVENTION

1. Field of the Invention

This invention relates to improvements in an interior material for an automotive vehicle as a decorative ember, such as a variety of garnishes for covering a clearance between a front windshield glass and a side window glass or a clearance between a ceiling and a door, more particularly to an improved structure of the garnishes having a sufficiently high stiffness to prevent the garnishes from making its resonance vibration and/or getting out of its position during running of the vehicle.

2. Description of the Prior Art

In general, an interior material called a garnish is used at the passenger compartment side of the vehicle body of an automotive vehicle (particularly, a passenger car) in order to cover a clearance between a ceiling and a door or a clearance between a front windshield glass and a side door glass. This interior material is mainly intended to decorate the upper part of the passenger compartment and used as a design part for covering the above clearance. An example of the interior material or garnish is a front pillar garnish P1 for covering the passenger compartment side of a front pillar P2 formed between a front windshield glass P3 and a side door glass P4 as shown in FIG. 7. The front pillar includes an inner panel and an outer panel which are combined at their flange sections by point welding such as spot welding. The interior material or pillar garnish is formed of ABS resin or polypropylene resin and includes a main body section which is integrally provided with an installation section P5 formed at the back side surface thereof. The installation section is a clip member which is to be thrust into a hole or groove in the inner panel of the front pillar, so that the pillar garnish is installed in position.

The main body section functions to cover the front pillar. The surface of the main body section may be covered with a skin material (not shown) as occasion demands in order to improve design effects. The skin material is a flocked plastic sheet or fabric. A seal member P6 made of rubber is disposed to cover the clearance between the pillar garnish and the front pillar and a welded section of the inner and outer panels for the purpose of trimming an end section of the pillar garnish at the side exposed to the eyes of a vehicle passenger. Additionally, the pillar garnish is provided at its backside surface with reinforcement ribs for the purpose of improving rigidity of the pillar garnish itself, such as flexural rigidity, torsional rigidity, rigidity under heating, and the like.

However, drawbacks have been encountered in the above conventional interior material or pillar garnish. That is to say, the reinforcement ribs of the pillar garnish serve as fixed ends in a resonance vibration system and therefore the main body section of the pillar garnish makes its resonance vibration under vibration and noise of the vehicle body during vehicle running and/or vibration due to wind whistling noise from the outside of the passenger compartment, so that the pillar garnish becomes a new vibration noise generating source. Accordingly, the noise and vibration characteristics inside the passenger compartment is degraded thereby obstructing clear conversation of passengers inside the passenger compartment.

Additionally, there is the possibility that the conventional pillar garnish is shifted in position and got out of its position or otherwise dented upon interference with the head or the hand of the passenger when the passenger gets on or off the vehicle, thereby degrading the inherent decorative function of the pillar garnish.

SUMMARY OF THE INVENTION

It is an object of the present invention to provide an improved interior material for an automotive vehicle, which can overcome drawbacks encountered in conventional interior materials.

Another object of the present invention is to provide an improved interior material for an automotive vehicle, which possesses a sufficiently high rigidity or stiffness thereby effectively maintaining inherent function of the interior material.

A further object of the present invention is to provide an improved interior material for an automotive vehicle, which can be effectively prevented from making its resonance vibration, for example, under vibration of booming noise during vehicle running, thereby improving noise and vibration characteristics within a passenger compartment so that clearness of conversion can be maintained within the passenger compartment during the vehicle running.

A still further object of the present invention is to provide an improved interior material for an automotive vehicle, which possesses such a sufficient strength and rigidity as that the interior material cannot be shifted and got out of its position or dented even upon interference with the head and the hand of the passenger when the passenger gets on and off the vehicle.

A first aspect of the present invention resides in an interior material for an automotive vehicle, comprising a main body section formed of plastic and secured to a vehicle body. The main body section is generally channel-shaped to cover a member forming part of the vehicle body. The main body section has an inner surface facing the member, and an outer surface facing a vehicle passenger inside a passenger compartment. A plurality of ribs are formed at the inner surface of the main body section to extend perpendicular to the inner surface. Each rib extends to occupy at least a part of a region surrounded by the inner surface of the main body section and first and second imaginary straight lines on a transverse plane perpendicular to a longitudinal axis of the main body section. The first imaginary straight line connects a first end of the inner surface with a second end of the inner surface of the main body section. The second imaginary straight line connects a center of the first imaginary straight line with a center of the inner surface of the main body.

A second aspect of the present invention resides in an interior material for an automotive vehicle, comprising a main body section formed of plastic and secured to a vehicle body. The main body section is generally channel-shaped to cover a member forming part of the vehicle body. The main body section has an inner surface facing the member, and an outer surface facing a vehicle passenger inside a passenger compartment. A plurality of reinforcement ribs are formed at the inner surface of the main body section to extend perpendicular to the inner surface. Additionally, a plurality of auxiliary ribs are formed at the inner surface of the main body section and extend parallel with each reinforcement rib. Each auxiliary rib is located between the reinforcement ribs which are located adjacent to each other. Each auxiliary rib extends to occupy at least a part of a region surrounded by the inner surface of the main body section and first and second imaginary straight lines in a transverse plane perpendicular to a longitudinal axis of the main body section. The first imaginary straight line connects a first end of the inner surface with a second end of the inner surface of the main body section. The second imaginary straight line connects a center of the first imaginary straight line with a center of the inner surface of the main body, each auxiliary rib being smaller in area than each reinforcement rib on the transverse plane.

A third aspect of the present invention resides in a pillar garnish for a front pillar disposed between a front windshield glass and a side window glass of an automotive vehicle, comprising a main body section formed of plastic and secured to a vehicle body. The main body section is generally channel-shaped to cover the front pillar forming part of the vehicle body. The main body section has an inner surface facing the front pillar, and an outer surface facing a vehicle passenger inside a passenger compartment. A plurality of reinforcement ribs are formed at the inner surface of the main body section and integral with the main body section. Each reinforcement rib extends perpendicular to the inner surface. Additionally, a plurality of auxiliary ribs are formed at the inner surface of the main body section and integral with the main body section. Each auxiliary rib extends parallel with each reinforcement rib. Each rib is located between the reinforcement ribs which are located adjacent each other. Each rib extends to occupy at least a part of a region surrounded by the inner surface of the main body section and first and second imaginary straight lines in a transverse plane perpendicular to a longitudinal axis of the main body section. The first imaginary straight line connects a first end of the inner surface with a second end of the inner surface of the main body section. The second imaginary straight line connects a center of the first imaginary straight line with a center of the inner surface of the main body. The region is located closer to the side window glass than to the front windshield glass. Each auxiliary rib is smaller in area than each reinforcement rib on the transverse plane. A distance between the reinforcement rib and the auxiliary rib which are adjacent to each other is within a range of from 10 to 40 mm.

According to the second and third aspects, the resonance frequencies of the interior material (pillar garnish) can be shifted to values not lower than 2 kHz. Accordingly, the pillar garnish can be effectively prevented from making its resonance vibration under vibration generating booming noise during vehicle running, thereby increasing clearness of passengers' conversation inside the passenger compartment while improving the noise and vibration performance inside the passenger compartment.

A fourth aspect of the present invention resides in a pillar garnish for a front pillar disposed between a front windshield glass and a side window glass of an automotive vehicle, comprising a main body section formed of plastic and secured to a vehicle body. The main body section is generally channel-shaped to cover a member forming part of the vehicle body. The main body section has an inner surface facing the front pillar, and an outer surface facing a vehicle passenger inside a passenger compartment. A plurality of ribs are formed at the inner surface of the main body section to extend perpendicular to the inner surface. Each rib extends to occupy at least a part of a region surrounded by the inner surface of the main body section and first and second imaginary straight lines in a transverse plane perpendicular to a longitudinal axis of the main body section. The first imaginary straight line connects a first end of the inner surface with a second end of the inner surface of the main body section. The second imaginary straight line connects a center of the first imaginary straight line with a center of the inner surface of the main body. The region is located closer to the side window glass than to the front windshield glass. Each rib has a thickness (t) ranging from 0.8 to 1.5 mm. The ribs are arranged such that a distance (d) between the adjacent ribs is within a range of from 10 to 60 mm, wherein the thickness (t) and the distance (d) are in a relationship represented by the following equation: $t^3/d \geq 0.017$.

According to the fourth aspect, the interior material possesses sufficient strength and rigidity and therefore is prevented from being shifted and got out of its position or dented even upon interference with the head and the hand of the vehicle passenger when the passenger gets on or off the vehicle, thus effectively exhibiting inherent decorative function of the interior material.

DETAILED DESCRIPTION OF THE INVENTION

Figure 1:
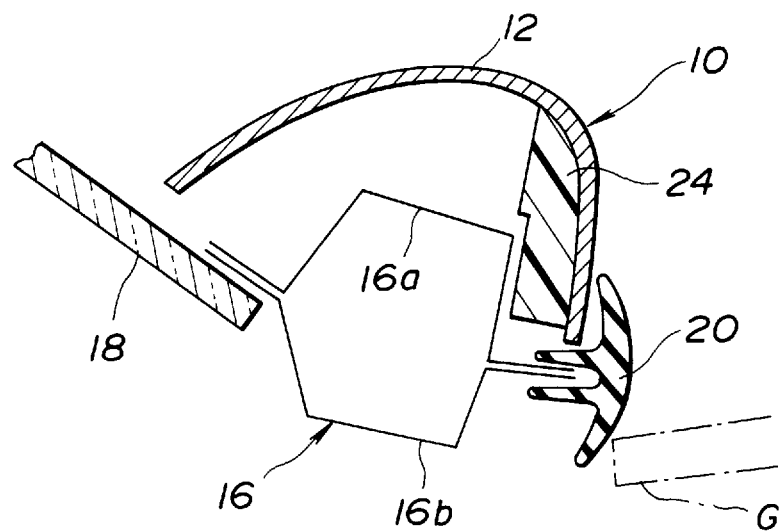
FIG. 1 is a fragmentary transverse cross-sectional view of an essential part of an automotive vehicle body, including an embodiment of an interior material according to the present invention, taken along a transverse plane.
Figure 2:
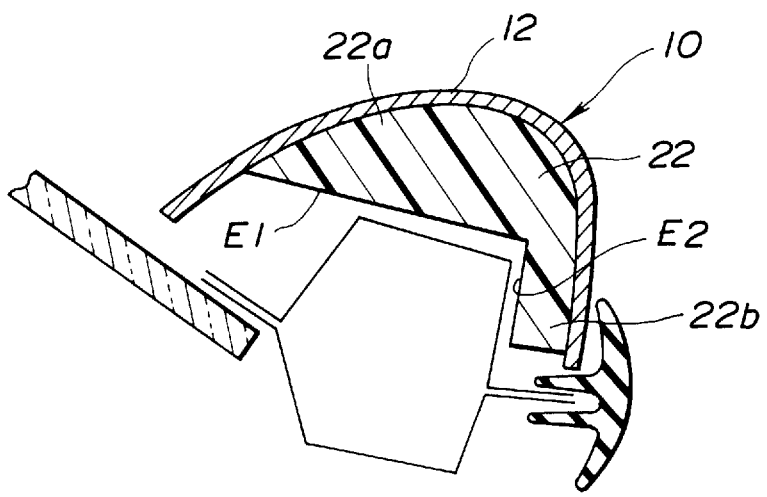
FIG. 2 is a fragmentary transverse cross-sectional view similar to FIG. 1 but showing the essential part of the automotive vehicle body including the interior material of FIG. 1, taken along a transverse plane other than that of FIG. 1.
Figure 3:
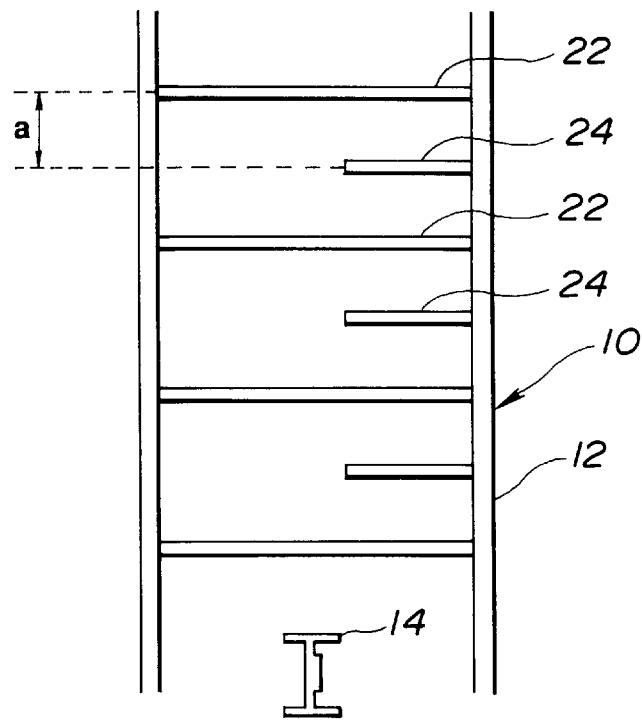
FIG. 3 is a plan view of the interior material of FIG. 1 as viewed from the side of the vehicle body.

Referring now to FIGS. 1 to 3, an embodiment of an interior material or member according to the present invention is illustrated by the reference numeral 10. The interior material of this embodiment is a front pillar garnish 10 for covering a front pillar 16 forming part of a vehicle body of an automotive vehicle. The front pillar 16 is disposed between a front windshield glass 18 and a side door or window glass G. The front pillar 16 includes inner and outer panels 16a, 16b which are combined with each other, for example, by spot welding which is made at the flange sections of the panels 16a, 16b, so that a closed space is defined between the inner and outer panels 16a, 16b.

Figure 10:
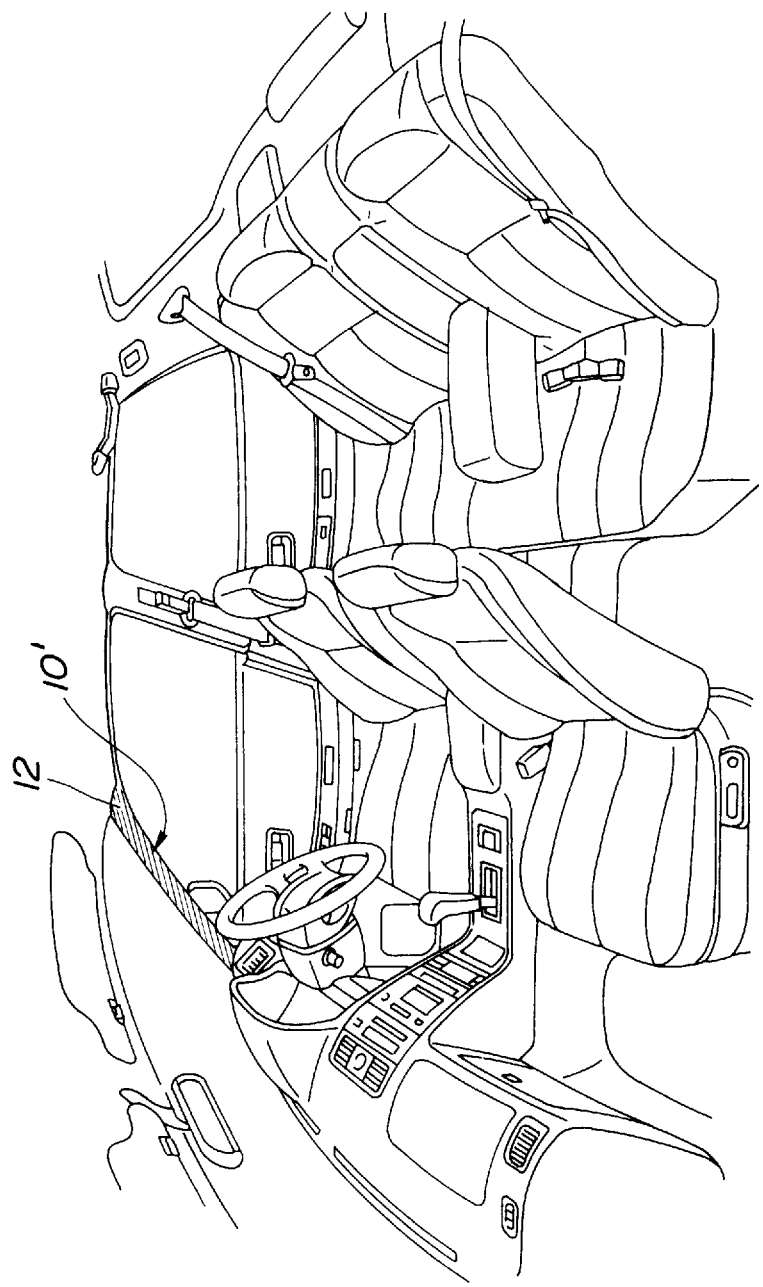
FIG. 10 is a perspective view showing an installation state in which the interior material of FIGS. 8 to 9 is installed on a front pillar inside a passenger compartment.

The pillar garnish 10 includes a main body section 12 which extends generally vertical as shown in FIG. 10 and is generally C-shaped or channel-shaped in section taken along a transverse plane to which the axis of the main body section 12 is perpendicular as shown in FIG. 1. The main body section 12 is secured to the side of the vehicle body (for example, the front pillar 16) through an engaging piece 14 as shown in FIG. 3. A seal member 20 formed of rubber or the like is disposed to cover a clearance between the pillar garnish 10 and the front pillar 16 and a welded section of the inner and outer panels 16a, 16b.

A plurality of reinforcement ribs 22 are integrally formed at the inner surface (or the surface facing the inner panel 16a of the front pillar 16) of the main body section 12 in a manner to extend from the inner surface of the main body section 12 toward the front pillar inner panel 16a as shown in FIG. 3. Each reinforcement rib 22 is generally plate-shaped and extends along the transverse plane. In other words, each reinforcement rib 22 is generally perpendicular to the inner surface of the main body section 12. Each reinforcement rib 22 of this embodiment is generally L-shaped in plan or viewed from the upper side of the vehicle as shown in FIG. 2. More specifically, each reinforcement rib 22 has a long straight edge E1 facing the side flat section (not identified) of the inner panel 16a, and a short straight edge E2 facing the rear flat section (not identified) of the inner panel 16a. Each reinforcement rib 22 has first and second sections 22a, 22b which are integral with each other. The first section 22a extends generally in the fore-and-aft direction of the vehicle body and has the long straight edge E1. The second section 22b extends generally laterally relative to the vehicle body and has the short straight edge E2. The second section 22b is located rear relative to the first section 22a in the fore-and-aft direction of the vehicle body.

Thus, each reinforcement rib 22 is formed generally along the surface (generally C-shaped in section) of the inner panel 16a of the front pillar 16. The reinforcement ribs 22 are arranged parallel with each other as shown in FIG. 3.

Additionally, a plurality of auxiliary ribs 24 are integrally formed at the inner surface of the main body section 12 in a manner to extend from the inner surface of the main body section 12 toward the front pillar inner panel 16a as shown in FIG. 1. Each auxiliary rib 24 is generally plate-shaped and extend parallel with the reinforcement ribs 22 so as to be perpendicular to the inner surface of the main body section 12. Each auxiliary rib 24 is located between the adjacent reinforcement ribs 22, 22 as shown in FIG. 3. In other words, each reinforcement rib 22 and each auxiliary rib 24 are located alternately in the axial direction of the main body section 12. Each auxiliary rib 24 is smaller in area than the reinforcement rib 22 on the above-mentioned transverse plane and located at the rear part of the pillar garnish 10. More specifically, each auxiliary rib 24 is located closer to the side window glass G than to the front windshield glass 18. The location of each auxiliary rib 24 generally corresponds to that of the second section 22b of the reinforcement rib 22. As shown in FIG. 3, in this embodiment, a distance (referred to as "Rib Distance") a between the adjacent ribs (the reinforcement rib 22 and the auxiliary rib 24) is set within a range of from 10 to 40 mm, preferably 10 to 20 mm. The pillar garnish 10 including the main body section 12 and the reinforcement and auxiliary ribs 22, 24 is formed of a thermoplastic resin such as ABS resin or polypropylene resin and molded into a one-piece structure.

Next, in order to evaluate the above range of the distance between the adjacent ribs, calculation of resonant frequency was made for Examples (within the above distance range) and Comparative Examples (outside of the above distance range).

EXAMPLE 1-1

Calculation of resonant frequency was made on two kinds of pillar garnishes 10. Each pillar garnish had the structure shown in FIGS. 1 to 3 and the rib distance a of 10 mm. One of the two kinds of the pillar garnishes 10, 10 had the main body section 12 having a thickness of 2.5 mm; and the other pillar garnish 10 had the main body section 12 having a thickness of 3.0 mm. The Young's modulus and the density of each pillar garnish 10 was 2000 MPa and 1.0 g/cm$^3$. The calculation of the resonant frequency was made according to the following equation:

$$\text{Resonant frequency:} f_n = \frac{(d1)^2}{2\pi l^2} \sqrt{\frac{EI}{\rho S}}$$

where primary resonance: d1=4.730
secondary resonance: d1=7.853
tertiary resonance: d1=10.996
E: Young's modulus
I: coefficient of inertia of area
S: cross-sectional area
$\rho$: density
l: distance between fixed points=rib distance

EXAMPLE 1-2

The calculation of the resonant frequency in Example 1-1 was repeated with the exception that the rib distance a of each pillar garnish was 15 mm.

EXAMPLE 1-3

The calculation of the resonant frequency in Example 1-1 was repeated with the exception that the rib distance a of each pillar garnish was 20 mm.

EXAMPLE 1-4

The calculation of the resonant frequency in Example 1-1 was repeated with the exception that the rib distance a of each pillar garnish was 25 mm.

EXAMPLE 1-5

The calculation of the resonant frequency in Example 1-1 was repeated with the exception that the rib distance a of each pillar garnish was 30 mm.

EXAMPLE 1-6

The calculation of the resonant frequency in Example 1-1 was repeated with the exception that the rib distance a of each pillar garnish was 35 mm.

EXAMPLE 1-7

The calculation of the resonant frequency in Example 1-1 was repeated with the exception that the rib distance a of each pillar garnish was 40 mm.

COMPARATIVE EXAMPLE 1-1

The calculation of the resonant frequency in Example 1-1 was repeated with the exception that the rib distance a of each pillar garnish was 50 mm.

COMPARATIVE EXAMPLE 1-2

The calculation of the resonant frequency in Example 1-1 was repeated with the exception that the rib distance a of each pillar garnish was 100 mm.

COMPARATIVE EXAMPLE 1-3

The calculation of the resonant frequency in Example 1-1 was repeated with the exception that the rib distance a of each pillar garnish was 150 mm.

COMPARATIVE EXAMPLE 1-4

The calculation of the resonant frequency in Example 1-1 was repeated with the exception that the rib distance a of each pillar garnish was 200 mm.

The results of the calculations of the Examples and the Comparative Examples are shown in Table 1.

Figure 5:
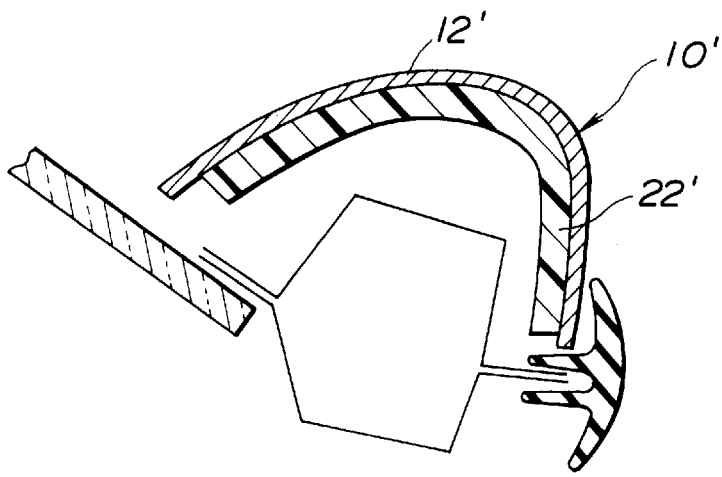
FIG. 5 is a fragmentary transverse cross-sectional view similar to FIG. 2 but showing a conventional interior material.
Figure 6:
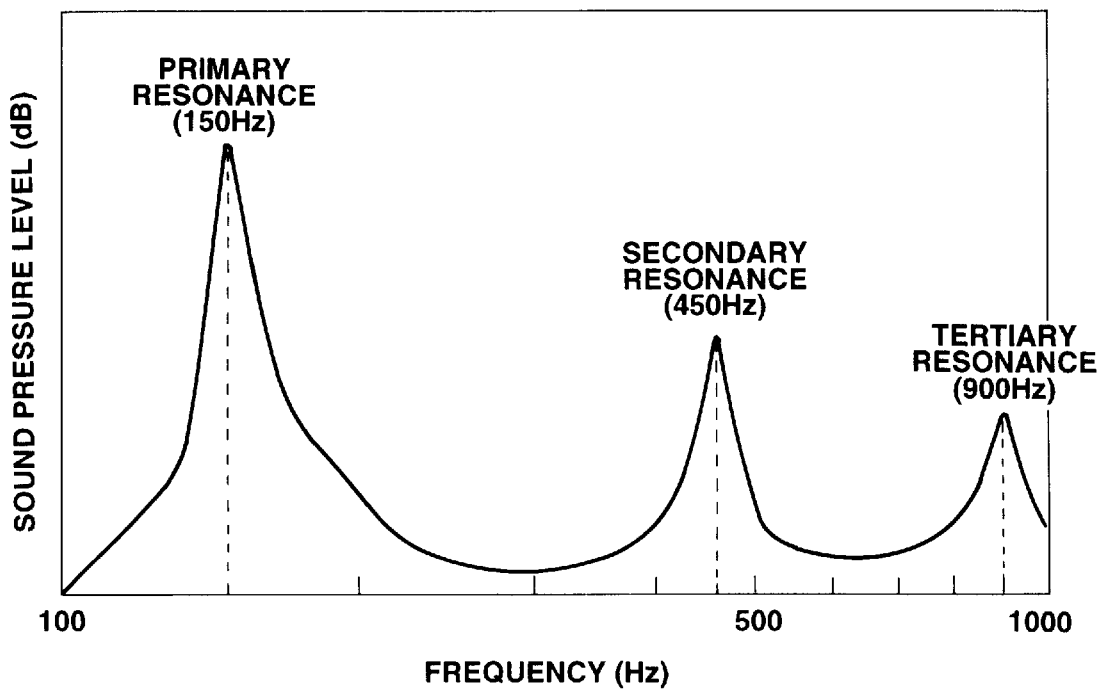
FIG. 6 is a graph showing noise and vibration characteristics of an automotive vehicle provided with the conventional interior material of FIG. 5.
Figure 7:
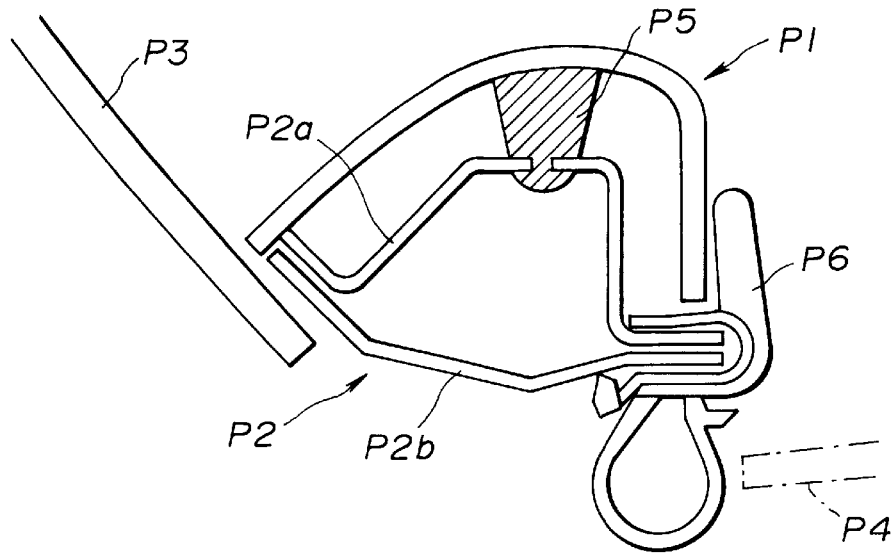
FIG. 7 is a fragmentary transverse cross-sectional view of an essential part of an automotive vehicle body, including a conventional interior material according to the present invention, taken along a transverse plane.

Additionally, for the comparison purpose, calculation of resonance frequency was made on a conventional pillar garnish 22' similar to the pillar garnish shown in FIGS. 1 to 3 with the exception that only reinforcement ribs 10' having a shape shown in FIG. 5 were provided without providing any auxiliary rib. The thickness of the main body section 12' was 2.5 mm, and the rib distance a was 200 mm. The results of the calculation of the resonance frequency are shown as a graph in FIG. 6.

Figure 4:
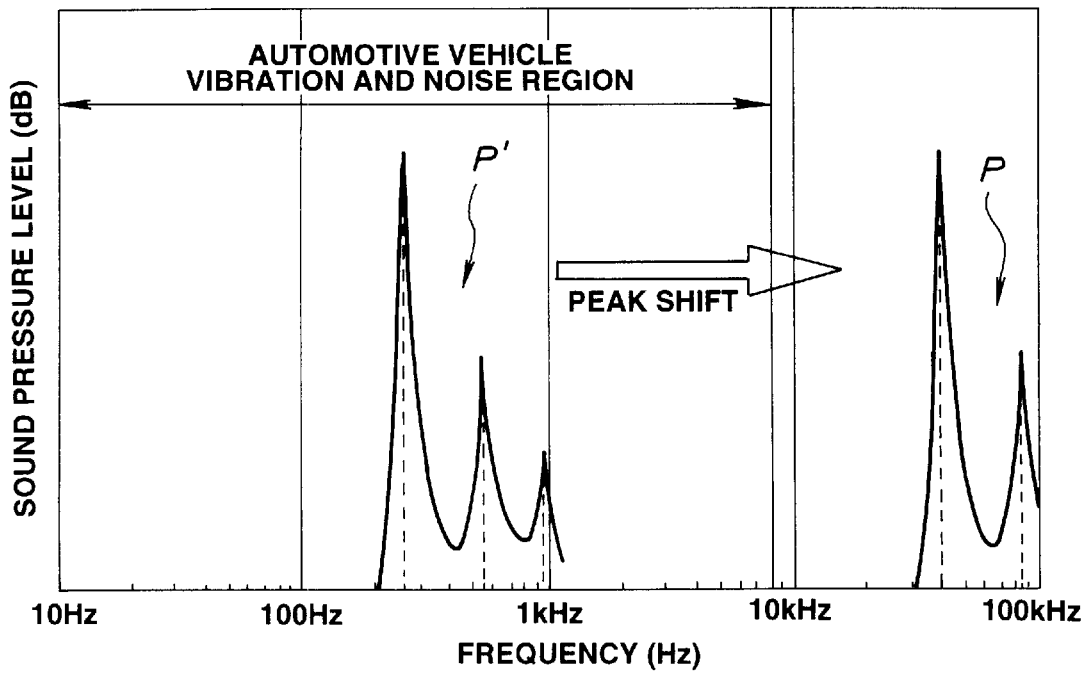
FIG. 4 is a graph showing effects of the interior material of FIG. 1 in connection with noise and vibration characteristics of an automotive vehicle.

The peaks of resonance frequencies at the primary, secondary and tertiary resonances in the conventional pillar garnish are shown as peaks P' also in FIG. 4. It is to be noted that the peaks P' of the resonance frequencies are inside a so-called automotive vehicle vibration and noise region in which various problematic noise and vibrations are generated during running of the automotive vehicle. The problematic noise and vibrations are generated within the passenger compartment and include so-called booming noise during vehicle running, noise during vehicle acceleration and so-called wind whistling noise. Thus, the conventional pillar garnish will make its resonance vibration under vibration generating booming noise during automotive vehicle running.

In FIG. 4, the general peaks of resonance frequencies at the primary and secondary resonances in the pillar garnishes of Examples are shown as peaks P which are outside the above-mentioned automotive vehicle vibration and noise region. Thus, FIG. 4 demonstrates that, according to the embodiment of FIGS. 1 to 3, the peaks of the resonance frequencies of pillar garnish can be shifted to the outside of the problematic automotive vehicle vibration and noise region, particularly outside of a booming noise generating range of from 0 to 2 KHz. As a result, the pillar garnishes of Examples can be prevented from making their resonance vibration throughout various vehicle running conditions.

As appreciated from the above, according to the interior material (pillar garnish) of the present invention, the resonance frequencies of the pillar garnish can be shifted to values not lower than 2 kHz. Accordingly, the pillar garnish can be effectively prevented from making its resonance vibration under vibration generating booming noise during vehicle running, thereby increasing clearness of passengers' conversation inside the passenger compartment while improving the noise and vibration performance inside the passenger compartment.

The resonance frequency of the main body section of the pillar garnish can be shifted to a value not lower than 8 kHz (for example, in Examples 1 to 3), so that the pillar garnish can be prevented from making its resonance vibration due to vibration not only under booming noise but also under acceleration noise and wind whistling noise.

Additionally, by virtue of the structure of the interior material of the present invention using a particular rib arrangement, the noise and vibration performance inside the passenger compartment can be effectively improved without unnecessarily increasing the weight of the interior material. Besides, it is unnecessary to use a medium such felt, non-woven fabric or polyurethane foam between the pillar garnish and the panel of the pillar forming part of the vehicle body, so that it is sufficient to use the one-piece pillar garnish which is simply molded under injection molding, thus simplifying the structure and lowering the production cost of the interior material such as the pillar garnish.

Furthermore, the reinforcing ribs and the auxiliary ribs serve as guides when the interior material (pillar garnish) is installed in position, thereby improving an assembling readiness while providing an impact energy absorbing effect at so-called secondary collision during vehicle collision or when a high impact is applied to the vehicle.

TABLE 1

| | | Thickness of main body section of pillar garnish | | | | | |
| | | 2.5 mm | | | 3.0 mm | | |
| | Rib distance a (mm) | Primary resonance (kHz) | Secondary resonance (kHz) | Tertiary resonance (kHz) | Primary resonance (kHz) | Secondary resonance (kHz) | Tertiary resonance (kHz) |
| --- | --- | --- | --- | --- | --- | --- | --- |
| Example 1-1 | 10 | 100.35 | 100.18 | 196.40 | 43.62 | 120.21 | 235.68 |
| Example 1-2 | 15 | 16.16 | 44.52 | 87.29 | 19.39 | 53.43 | 104.75 |
| Example 1-3 | 20 | 9.09 | 25.04 | 49.10 | 10.91 | 30.05 | 58.92 |
| Example 1-4 | 25 | 5.82** | 16.03 | 31.42 | 6.98** | 19.23 | 37.71 |
| Example 1-5 | 30 | 4.04** | 11.13 | 21.82 | 4.85** | 13.36 | 26.19 |
| Example 1-6 | 35 | 2.97** | 8.18 | 16.03 | 3.56** | 9.81 | 19.24 |
| Example 1-7 | 40 | 2.27** | 6.26** | 12.28 | 2.73** | 7.51** | 14.73 |
| Comparative | 50 | 1.45* | 4.01** | 7.86** | 1.74* | 4.81** | 9.43 |

TABLE 1-continued

| | | Thickness of main body section of pillar garnish | | | | | |
| | | 2.5 mm | | | 3.0 mm | | |
| | Rib distance a (mm) | Primary resonance (kHz) | Secondary resonance (kHz) | Tertiary resonance (kHz) | Primary resonance (kHz) | Secondary resonance (kHz) | Tertiary resonance (kHz) |
| --- | --- | --- | --- | --- | --- | --- | --- |
| Example 1-1 Comparative Example 1-2 | 100 | 0.36* | 1.00* | 1.96* | 0.44* | 1.20* | 2.36** |
| Comparative Example 1-3 | 150 | 0.16* | 0.25* | 0.87* | 0.19* | 0.53* | 1.05* |
| Comparative Example 1-4 | 200 | 0.09* | 0.25* | 0.49* | 0.11* | 0.30* | 0.59* |

Figure 8:
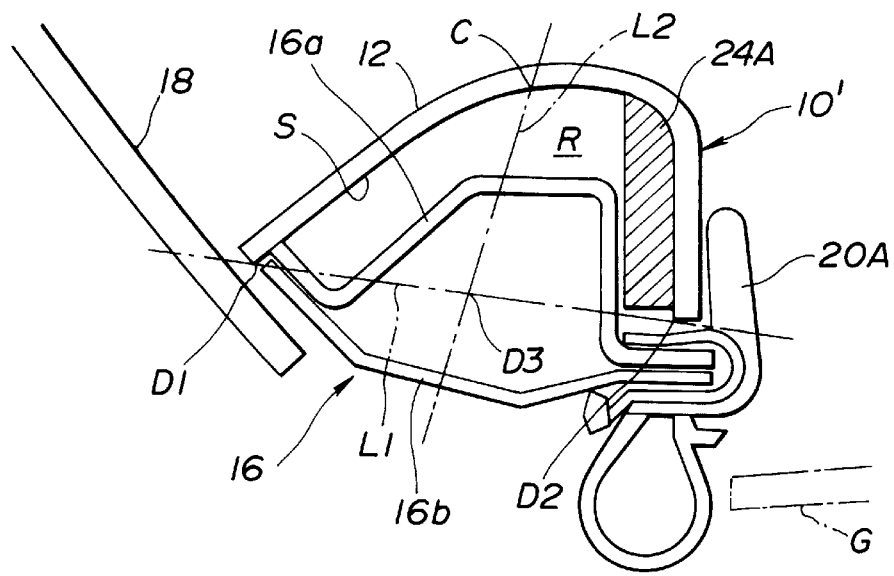
FIG. 8 is a fragmentary transverse cross-sectional view of an essential part of an automotive vehicle body including another embodiment of the interior material according to the present invention, taken along a transverse plane.

*Resonance frequency not higher than 2 kHz
**Resonance frequency higher than 2 kHz and not higher than 8 kHz FIG. 8 illustrates another embodiment of the interior material or member according to the present invention. In this embodiment, the interior material is the front pillar garnish 10' for covering the front pillar 16 forming part of the vehicle body of an automotive vehicle. The front pillar 16 is disposed between the front windshield glass 18 and the side window or door glass G. The front pillar 16 includes the inner and outer panels 16a, 16b which are combined with each other, for example, by spot welding which is made at the flange sections of the panels 16a, 16b, so that the closed space is defined between the inner and outer panels 16a, 16b.

The pillar garnish 10' includes the main body section 12 which extends generally vertical and generally channel-shaped or C-shaped on the transverse plane to which the axis of the main body section 12 is perpendicular. The main body section 12 is secured to a part of the vehicle body, for example, the front pillar 16. A welt 20A is disposed to cover a clearance between the pillar garnish 10' and the front pillar 16 and a welded section of the inner and outer panels 16a, 16b.

A plurality of ribs 24A are integrally formed at the inner surface of the main body section 12 in a manner to extend from the inner surface of the main body section 12 toward the front pillar inner panel 16a as shown in FIG. 8. Each rib 24A is generally plate-shaped and extends along the transverse plane. In other words, each rib 24A is generally perpendicular to the inner surface of the main body section 12.

The ribs 24A are arranged along the length of the main body section 12 in such a manner that a distance "d" (referred to as "Rib Pitch, not shown in FIG. 8") between the adjacent ribs 24A, 24A is within a range of from 10 to 60 mm. The thickness "t" (not shown in FIG. 8) of each rib is within a range of from 0.8 to 1.5 mm. The distance d and the thickness t are in the relationship represented by the following equation: $t^3/d \geq 0.017$.

Each rib 24A is located as follows: As shown in FIG. 8, the transverse cross-sectional shape of the main body section 12 is generally C-shaped or channel-shaped so that the inner surface S is generally C-shaped on the transverse plane. Additionally, the inner surface of the main body section 12 in the transverse cross-section has a center C and opposite cross-sectional ends D1, D2 which are shown to be connected by an imaginary straight line L1 having a center D3. The cross-sectional center C and the center D3 is shown to be connected by an imaginary straight line L2. Each rib 24A is located to occupy at least a part of a region "R" surrounded by the inner surface of the main body section 12 and the imaginary straight lines L1, L2, on the transverse plane as shown in FIG. 8. The region R is located closer to the side door or window glass G of the automotive vehicle than the other region (not identified) surrounded by the inner surface of the main body section 12 and the imaginary straight lines L1, L2.

The reason why each rib 24A is formed inside the above region R or close to the side door or window glass G is as follows: Of various modes in which the hand and the head of a vehicle passenger interfere with the pillar garnish when the passenger getting on and off the vehicle, a mode in which the pillar garnish is pressed by the passenger is predominant whereas a mode in which the pillar garnish is pulled down is hardly made. Accordingly, it will be understood that it is preferable to located each rib 24A in a position opposite to or far from the front windshield glass 18.

Figure 9:
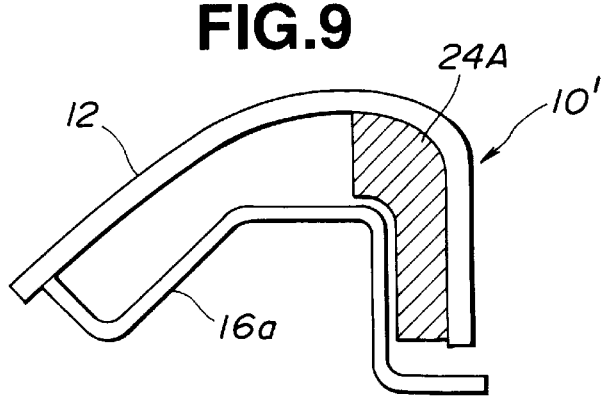
FIG. 9 is a fragmentary transverse cross-sectional view similar to FIG. 8 but showing a modified example of the interior material of FIG. 8.

FIG. 9 shows a modified example of the front pillar garnish of the embodiment of FIG. 8, which is similar to the embodiment except for the shape of each rib 24A.

Figure 11:
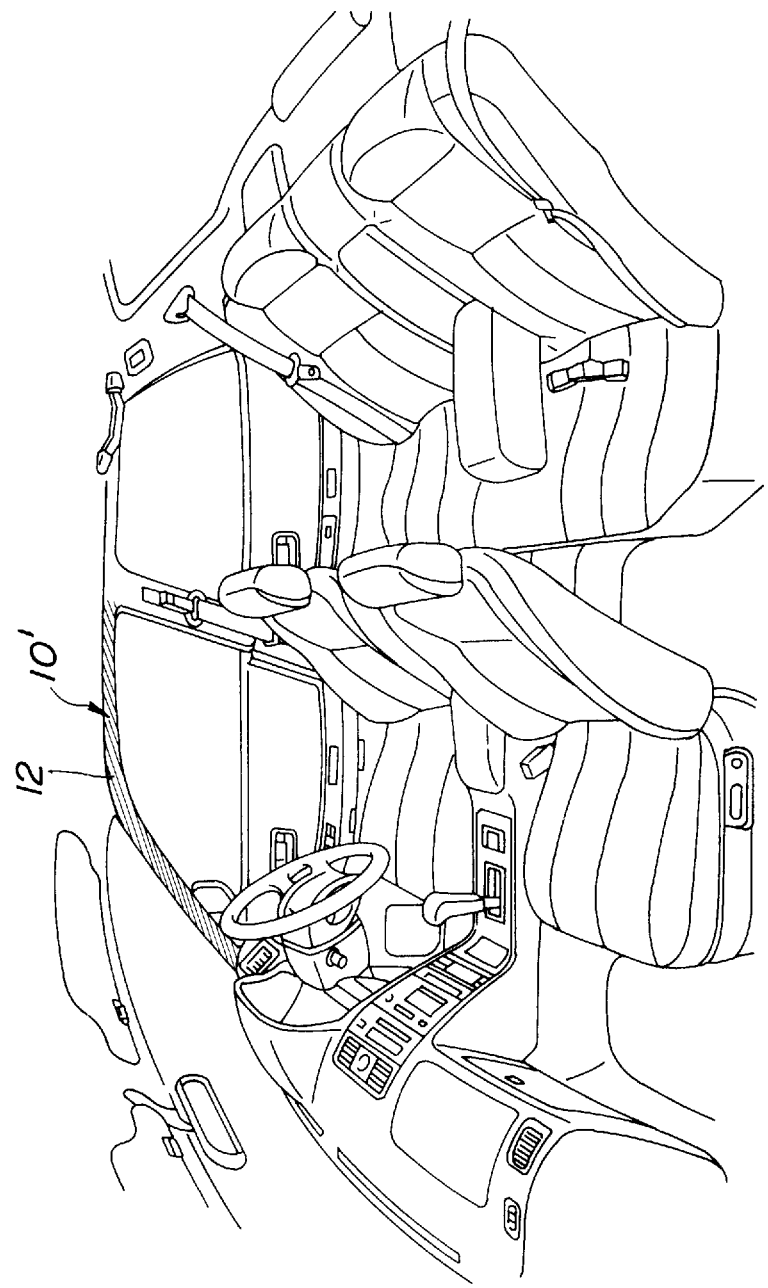
FIG. 11 is a perspective view similar to FIG. 10 but showing another installation state in which the interior material of FIGS. 8 to 9 is installed to extend to a part above a side door of the automotive vehicle.

FIGS. 10 and 11 show the position (shaded) of the front pillar garnish, 10'. The front pillar garnish 10 in FIG. 10 is formed to cover the front pillar, while the front pillar garnish 10" in FIG. 11 is formed extending to cover also a roof side rail.

Next, in order to facilitate understanding of the embodiment of the present invention, Examples and Comparative Examples will be discussed.

EXAMPLE 2-1

A front pillar garnish as shown in FIG. 8 was molded from a thermoplastic resin to have ribs (24A) having a thickness of 0.8 mm and a rib pitch of 30 mm.

EXAMPLE 2-2

A front pillar garnish as shown in FIG. 8 was molded from a thermoplastic resin to have ribs (24A) having a thickness of 1.0 mm and a rib pitch of 50 mm.

EXAMPLE 2-3

A front pillar garnish as shown in FIG. 8 was molded from a thermoplastic resin to have ribs (24A) having a thickness of 1.5 mm and a rib pitch of 50 mm.

EXAMPLE 2-4

A front pillar garnish as shown in FIG. 8 was molded from a thermoplastic resin to have ribs (24A) having a thickness of 1.5 mm and a rib pitch of 60 mm.

EXAMPLE 2-5

A front pillar garnish as shown in FIG. 9 was molded from a thermoplastic resin to have ribs (24A) having a thickness of 1.0 mm and a rib pitch of 50 mm.

COMPARATIVE EXAMPLE 2-1

A front pillar garnish as shown in FIG. 8 was molded from a thermoplastic resin to have ribs (24A) having a thickness of 0.8 mm and a rib pitch of 40 mm.

COMPARATIVE EXAMPLE 2-2

A front pillar garnish as shown in FIG. 8 was molded from a thermoplastic resin to have ribs (24A) having a thickness of 1.0 mm and a rib pitch of 60 mm.

COMPARATIVE EXAMPLE 2-3

A front pillar garnish as shown in FIG. 8 was molded from a thermoplastic resin to have ribs (24A) having a thickness of 1.5 mm and a rib pitch of 80 mm.

COMPARATIVE EXAMPLE 2-4

A front pillar garnish as shown in FIG. 8 was molded from a thermoplastic resin to have ribs (24A) having a thickness of 0.5 mm and a rib pitch of 20 mm.

COMPARATIVE EXAMPLE 2-5

A front pillar garnish as shown in FIG. 8 was molded from a thermoplastic resin to have ribs (24A) having a thickness of 2.0 mm and a rib pitch of 50 mm.

CONVENTIONAL EXAMPLE 2-1

Figure 12:
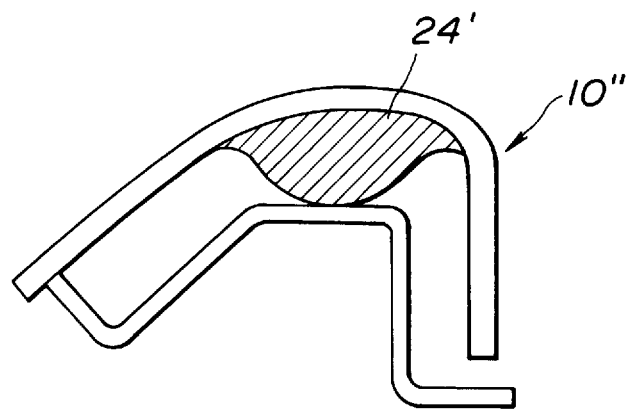
FIG. 12 is a fragmentary transverse cross-sectional view similar to FIG. 8 but showing another conventional interior material.

A front pillar garnish 10" as shown in FIG. 12 was molded from the thermoplastic resin to have ribs having a thickness of 1.0 mm and a rib pitch of 50 mm. The front pillar garnish as shown in FIG. 12 was conventional in which each rib 24A' was in contact with the inner panel of a front pillar.

CONVENTIONAL EXAMPLE 2-2

Figure 13:
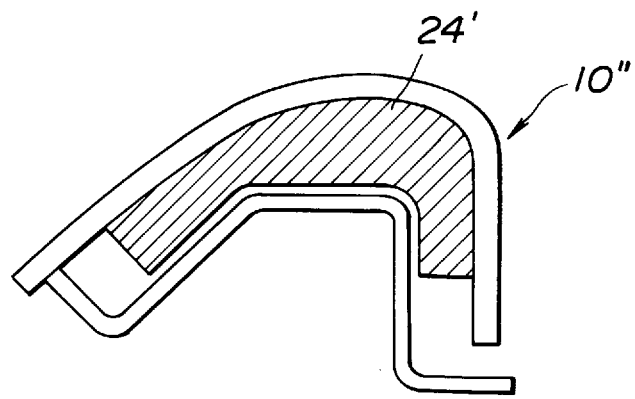
FIG. 13 is a fragmentary transverse cross-sectional view similar to FIG. 8 but showing a further conventional interior material.

A front pillar garnish 10" as shown in FIG. 13 was molded from a thermoplastic resin to have ribs 24A' having a thickness of 1.0 mm and a rib pitch of 50 mm. The front pillar garnish as shown in FIG. 13 was conventional in which the rib was generally C-shaped in plan.

The thermoplastic resins used in the above Examples, Comparative Examples and Conventional Examples were the same thermoplastic resin which had been generally used for the material of an automotive vehicle parts. The molding of the respective front pillar garnished was made under the same injection molding.

The molded front pillar garnishes of the Examples, Comparative Examples and Conventional Examples were subjected to Experiments 1, 2 and 3 to evaluate the performance of the respective front pillar garnishes.

EXPERIMENT 1

In order to evaluate denting characteristics of each molded pillar garnish (10, 10', 10'"), a buckling reaction force of the main body section (12) of each pillar garnish was measured as follows: A static compression was applied onto the main body section (12) by a pressing member. The pressing member had the same width (about 100 mm) as a hand of an male adult. Since measured values (indicated as "Reaction force (N)" in Table 2) of the buckling reaction force might changed in accordance with a locational relationship between the center of the rib and the center of the pressing member, the minimum measured value (shown in Table 2) was used for evaluation for the denting characteristics. In case that the minimum measured value was not lower than 1000N, judgment was made as "Good (G)" in denting characteristics. If the value was lower than 1000N, the judgment was made as "No good (NG)" in denting characteristics, in which the pillar garnish might be dented or get out of its position when force input from a passenger was applied to the pillar garnish. The results of this evaluation test are shown in Table 2.

EXPERIMENT 2

In order to evaluate a surface characteristics of each molded pillar garnish, sink mark formed at the surface (formed with wrinkles) of the main body section (12) of the pillar garnish was observed by the naked eye. If the sink mark was at a level which degraded the commercial value of the pillar garnish, judgment was made as "No good (NG)". On the contrary, in case that the sink mark was at a level which did not degrade the commercial value of the pillar garnish, judgment was made as "Good (G)". The results of this evaluation test are shown in Table 2.

EXPERIMENT 3

A sunshine test was conducted on each front pillar garnish to evaluate a sunshine resistance of the front pillar garnish. An automotive vehicle was located in a position where direct sunlight was incident on a front windshield glass from the front side of the vehicle under sunshine, in which the pillar garnish was installed in position inside the vehicle. Lifting or projecting state of the surface of the main body section (12) of the front pillar garnish was observed by the naked eye after lapse of 2 hours under a state where the vehicle was located at above-mentioned position. The lifting state was judged as "Good (G)" or "No good (NG)". The results of the evaluation are shown in Table 2.

Upon totally evaluating the results of the above Experiments 1, 2 and 3, a judgment of total characteristics of each front pillar garnish was made to judge "Good (G)" or "No good (NG)" in total evaluation. The results of this total evaluation are shown in Table 2.

As apparent from Table 2, in case that each rib (24A) of the front pillar garnish is within the range of from 0.8 to 1.5 mm and has the rib pitch not larger than 60 mm, the pillar garnish can have a sufficient strength and rigidity thereby to prevent the front pillar garnish from being got out of its position and/or being dented upon interference with the head or hand of the passenger during the passenger's getting on and off. However, it was impossible to mold the pillar garnish having the rib pitch smaller than 10 mm from the view point of strength of the metal mold upon injection molding. Thus, the rib pitch is preferable to be within the range of from 10 to 60 mm.

By forming the rib in the shape as shown in FIG. 9, sufficient stiffness feeling or rigidity feeling can be provided to the pillar garnish like in the conventional pillar garnishes as shown in FIGS. 12 and 13.

The interior materials of this embodiment serve also as an impact energy absorbing material which can absorb impact energy at so-called secondary collision of the passenger when impact is applied to the vehicle.

The pillar garnishes of Comparative Examples 2-1 to 2-5 are low in buckling reaction force to form dent or inferior in surface characteristics. Thus, the pillar garnishes of the Comparative Examples cannot solve the problems of the pillar garnish being got out of its position and/or being dented upon interference with the passenger.

TABLE 2

|  | Shape of rib | Thickness of rib (mm) | Reaction force per each rib (N) | Rib pitch (mm) | t³/d | Reaction force (N) | Denting characteristics | Surface characteristics | Sunshine test | Total evaluation |
|---|---|---|---|---|---|---|---|---|---|---|
| Example 2-1 | FIG. 8 | 0.8 | 250 | 30 | 0.017 | 1000 | G | G | G | G |
| Comparative Example 2-1 | FIG. 8 | 0.8 | 250 | 40 | 0.012 | 750 | NG | G | G | NG |
| Example 2-2 | FIG. 8 | 1.0 | 500 | 50 | 0.02 | 1000 | G | G | G | G |
| Comparative Example 2-2 | FIG. 8 | 1.0 | 500 | 60 | 0.016 | 500 | NG | G | G | NG |
| Example 2-3 | FIG. 8 | 1.5 | 1400 | 50 | 0.068 | 2800 | G | G | G | G |
| Example 2-4 | FIG. 8 | 1.5 | 1400 | 60 | 0.056 | 1400 | G | G | G | G |
| Comparative Example 2-3 | FIG. 8 | 1.5 | 1400 | 80 | 0.042 | 900 | NG | G | G | NG |
| Example 2-5 | FIG. 9 | 1.0 | 550 | 50 | 0.02 | 1100 | G | G | G | G |
| Comparative Example 2-4 | FIG. 8 | 0.5 | 65 | 20 | 0.006 | 325 | NG | G | G | NG |
| Comparative Example 2-5 | FIG. 8 | 2.0 | 3000 | 50 | 0.16 | 3000 | G | NG | G | NG |
| Comparative Example 2-1 | FIG. 12 | 1.0 | 0 | 50 | — | 0 | NG | G | G | NG |
| Comparative Example 2-2 | FIG. 13 | 1.0 | 500 | 50 | — | 1000 | G | G | NG | NG |

What is claimed is:

1. An interior material for an automotive vehicle having a vehicle body and a passenger compartment, comprising:
   a main body section formed of plastic and secured to the vehicle body, said main body section being generally channel-shaped to cover a member forming part of the vehicle body, said main body section having an inner surface facing the member, and an outer surface facing a vehicle passenger inside the passenger compartment;
   a plurality of reinforcement ribs formed at the inner surface of said main body section to extend perpendicular to the inner surface; and
   a plurality of auxiliary ribs formed at the inner surface of said main body section and extending parallel with each reinforcement rib, each auxiliary rib being located between said reinforcement ribs which are located adjacent to each other, each auxiliary rib extending to occupy at least a part of a region surrounded by the inner surface of said main body section and first and second imaginary straight lines in a transverse plane perpendicular to a longitudinal axis of said main body section, said first imaginary straight line connecting a first end of the inner surface with a second end of the inner surface of said main body section, said second imaginary straight line connecting a center of the first imaginary straight line with a center of the inner surface of the main body, each auxiliary rib being smaller in area than each reinforcement rib on the transverse plane.

2. An interior material as claimed in claim 1, wherein a distance between said reinforcement rib and said auxiliary rib which are adjacent to each other is within a range of from 10 to 40 mm.

3. An interior material as claimed in claim 1, wherein each reinforcement rib and each auxiliary rib are formed of plastic and are integral with said main body section to form a one-piece structure.

4. An interior material as claimed in claim 1, wherein each auxiliary rib has an area not larger than ½ of that of each reinforcement rib on the transverse plane.

5. An interior material as claimed in claim 1, wherein said main body section has a resonant frequency not lower than 2 kHz.

6. An interior material as claimed in claim 5, wherein said main body section has a resonant frequency not lower than 8 kHz.

7. A pillar garnish for a front pillar disposed between a front windshield glass and a side window glass of an automotive vehicle, the automotive vehicle having a vehicle body and a passenger compartment, the pillar garnish comprising:
   a main body section formed of plastic and secured to a vehicle body, said main body section being generally channel-shaped to cover the front pillar forming part of the vehicle body, said main body section having an inner surface facing the member, and an outer surface facing the vehicle passenger inside a passenger compartment;
   a plurality of reinforcement ribs formed at the inner surface of said main body section and integral with said main body section, each reinforcement rib extending perpendicular to the inner surface; and
   a plurality of auxiliary ribs formed at the inner surface of said main body section and integral with said main body section, each auxiliary rib extending parallel with each reinforcement rib, each rib being located between said reinforcement ribs which are located adjacent each other, each rib extending to occupy at least a part of a region surrounded by the inner surface of said main body section and first and second imaginary straight lines in a transverse plane perpendicular to a longitudinal axis of said main body section, said first imaginary straight line connecting a first end of the inner surface with a second end of the inner surface of said main body section, said second imaginary straight line connecting a center of the first imaginary straight line with a center of the inner surface of the main body, said region being located closer to the side window glass than to the front windshield glass, each auxiliary rib being smaller in area than each reinforcement rib on the transverse plane, a distance between said reinforcement rib and said auxiliary rib which are adjacent to each other being within a range of from 10 to 40 mm.

8. A pillar garnish for a front pillar disposed between a front windshield glass and a side window glass of an automotive vehicle, the automotive vehicle having a vehicle body and a passenger compartment, the pillar garnish comprising:

a main body section formed of plastic and secured to the vehicle body, said main body section being generally channel-shaped to cover the front pillar forming part of the vehicle body, said main body section having an inner surface facing the member, and an outer surface facing the vehicle passenger inside a passenger compartment; and a plurality of ribs formed at the inner surface of said main body section to extend perpendicular to the inner surface, each rib extending to occupy at least a part of a region surrounded by the inner surface of said main body section and first and second imaginary straight lines in a transverse plane perpendicular to a longitudinal axis of said main body section, said first imaginary straight line connecting a first end of the inner surface with a second end of the inner surface of said main body section, said second imaginary straight line connecting a center of the first imaginary straight line with a center of the inner surface of the main body, said region being located closer to the side window glass than to the front windshield glass, each rib having a thickness (t) ranging from 0.8 to 1.5 mm, said ribs being arranged such that a distance (d) between said adjacent ribs is within a range of from 10 to 60 mm, wherein the thickness (t) and the distance (d) are in a relationship represented by the following equation: $t^3/d \geq 0.017$.

9. A pillar garnish as claimed in claim 8, wherein each rib is formed of plastic and is integral with said main body section to form a one-piece structure.

* * * * *